US008701415B2

(12) United States Patent
Flanagan et al.

(10) Patent No.: US 8,701,415 B2

(45) Date of Patent: Apr. 22, 2014

(54) FLEXIBLE METALLIC SEAL FOR TRANSITION DUCT IN TURBINE SYSTEM

(75) Inventors: James Scott Flanagan, Simpsonville, SC (US); Jeffrey Scott LeBegue, Simpsonville, SC (US); Kevin Weston McMahan, Greer, SC (US); Daniel Jackson Dillard, Greenville, SC (US); Ronnie Ray Pentecost, Travelers Rest, SC (US)

(73) Assignee: General Electric Company, Schenectady, NY (US)

(*) Notice: Subject to any disclaimer, the term of this patent is extended or adjusted under 35 U.S.C. 154(b) by 237 days.

(21) Appl. No.: 13/292,389

(22) Filed: Nov. 9, 2011

(65) Prior Publication Data

US 2013/0111912 A1 May 9, 2013

(51) Int. Cl.

| | |
|---|---|
| ***F02C 1/00*** | (2006.01) |
| ***F16J 15/02*** | (2006.01) |
| ***F01D 5/00*** | (2006.01) |

(52) U.S. Cl.

USPC .......... 60/752; 277/312; 277/314; 415/170.1; 415/174.2

(58) Field of Classification Search

USPC ................... 60/752, 754–760, 796, 799, 800; 277/312, 314; 415/170.1, 174.2

See application file for complete search history.

(56) References Cited

U.S. PATENT DOCUMENTS

| | | | |
|---|---|---|---|
| 4,422,288 A | | 12/1983 | Steber |
| 5,077,967 A | | 1/1992 | Widener et al. |
| 5,118,120 A | | 6/1992 | Drerup et al. |
| 5,149,250 A | | 9/1992 | Plemmons et al. |
| 5,249,920 A | | 10/1993 | Shepherd et al. |
| 5,265,412 A | * | 11/1993 | Bagepalli et al. ............... 60/800 |
| 5,414,999 A | | 5/1995 | Barnes |
| 5,457,954 A | | 10/1995 | Boyd et al. |
| 5,592,820 A | | 1/1997 | Alary et al. |
| 5,761,898 A | | 6/1998 | Barnes et al. |
| 5,839,283 A | | 11/1998 | Dübbeling |
| 5,934,687 A | | 8/1999 | Bagepalli et al. |
| 6,076,835 A | | 6/2000 | Ress et al. |
| 6,202,420 B1 | | 3/2001 | Zarzalis et al. |
| 6,203,025 B1 | | 3/2001 | Hayton |
| 6,431,555 B1 | | 8/2002 | Schroder et al. |
| 6,431,825 B1 | | 8/2002 | McLean |
| 6,442,946 B1 | | 9/2002 | Kraft et al. |
| 6,471,475 B1 | | 10/2002 | Sasu et al. |
| 6,537,023 B1 | | 3/2003 | Aksit et al. |
| 6,564,555 B2 | | 5/2003 | Rice et al. |
| 6,652,229 B2 | | 11/2003 | Lu |
| 6,662,567 B1 | | 12/2003 | Jorgensen |
| 7,007,480 B2 | | 3/2006 | Nguyen et al. |
| 7,024,863 B2 | | 4/2006 | Morenko |
| 7,181,914 B2 | | 2/2007 | Pidcock et al. |
| 7,584,620 B2 | | 9/2009 | Weaver et al. |

(Continued)

*Primary Examiner* — William H Rodriguez

*Assistant Examiner* — Arun Goyal

(74) *Attorney, Agent, or Firm* — Dority & Manning, PA

(57) ABSTRACT

A turbine system is disclosed. In one embodiment, the turbine system includes a transition duct. The transition duct includes an inlet, an outlet, and a passage extending between the inlet and the outlet and defining a longitudinal axis, a radial axis, and a tangential axis. The outlet of the transition duct is offset from the inlet along the longitudinal axis and the tangential axis. The transition duct further includes an interface member for interfacing with a turbine section. The turbine system further includes a flexible metallic seal contacting the interface member to provide a seal between the interface member and the turbine section.

16 Claims, 8 Drawing Sheets

(56) References Cited

U.S. PATENT DOCUMENTS

| | | | |
|---|---|---|---|
| 7,637,110 | B2 | 12/2009 | Czachor et al. |
| 7,721,547 | B2 | 5/2010 | Bancalari et al. |
| 8,322,146 | B2 | 12/2012 | Rizkalla et al. |
| 2010/0037617 | A1 | 2/2010 | Charron et al. |
| 2010/0037618 | A1 | 2/2010 | Charron et al. |
| 2010/0037619 | A1 | 2/2010 | Charron |
| 2010/0115953 | A1 | 5/2010 | Davis, Jr. et al. |
| 2010/0180605 | A1 | 7/2010 | Charron |
| 2011/0014029 | A1 * | 1/2011 | Venkataraman et al. ..... 415/110 |
| 2011/0259015 | A1 | 10/2011 | Johns et al. |
| 2012/0304653 | A1 | 12/2012 | Flanagan et al. |
| 2012/0304665 | A1 | 12/2012 | LeBegue et al. |

* cited by examiner

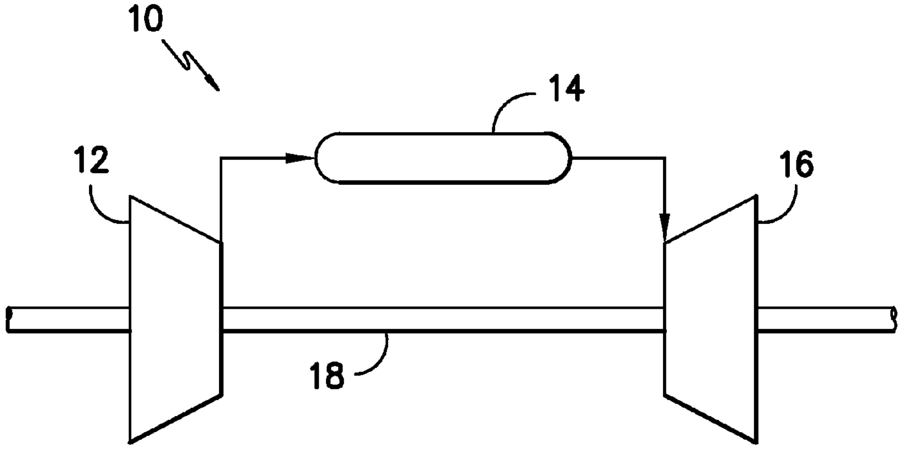
FIG. –1–
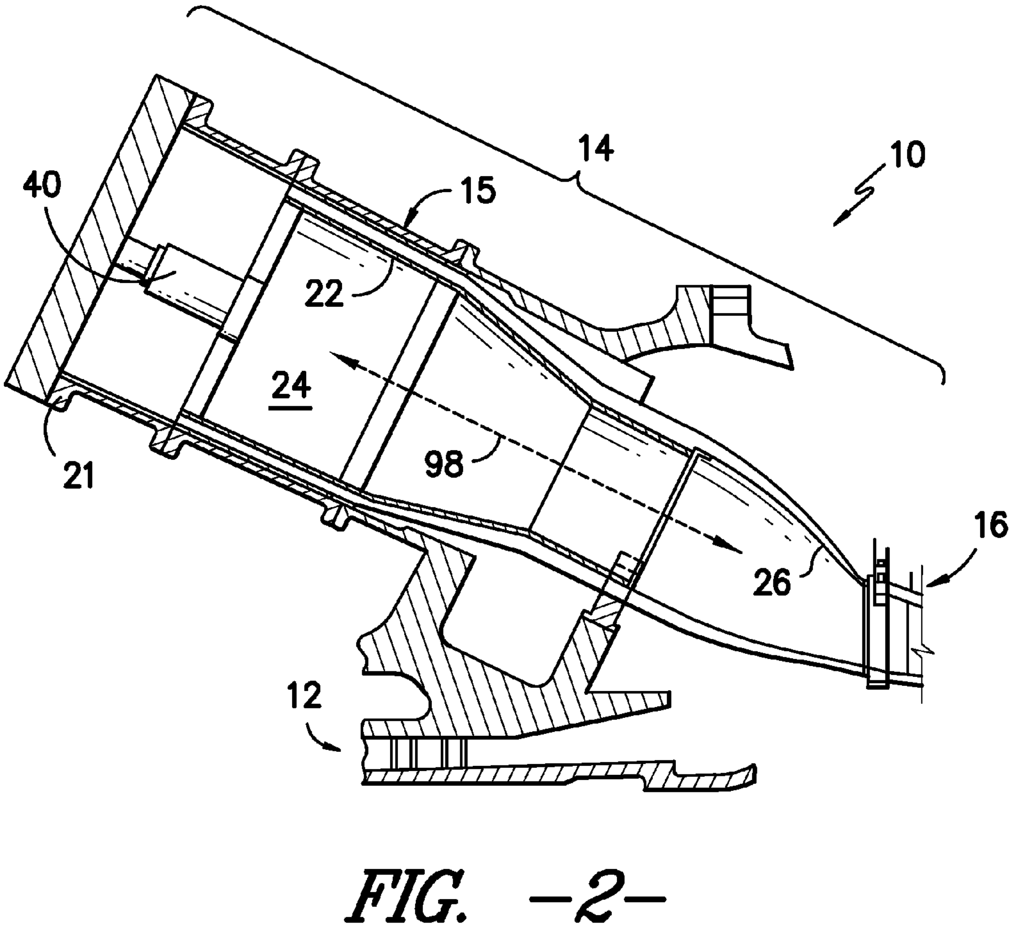
FIG. –2–

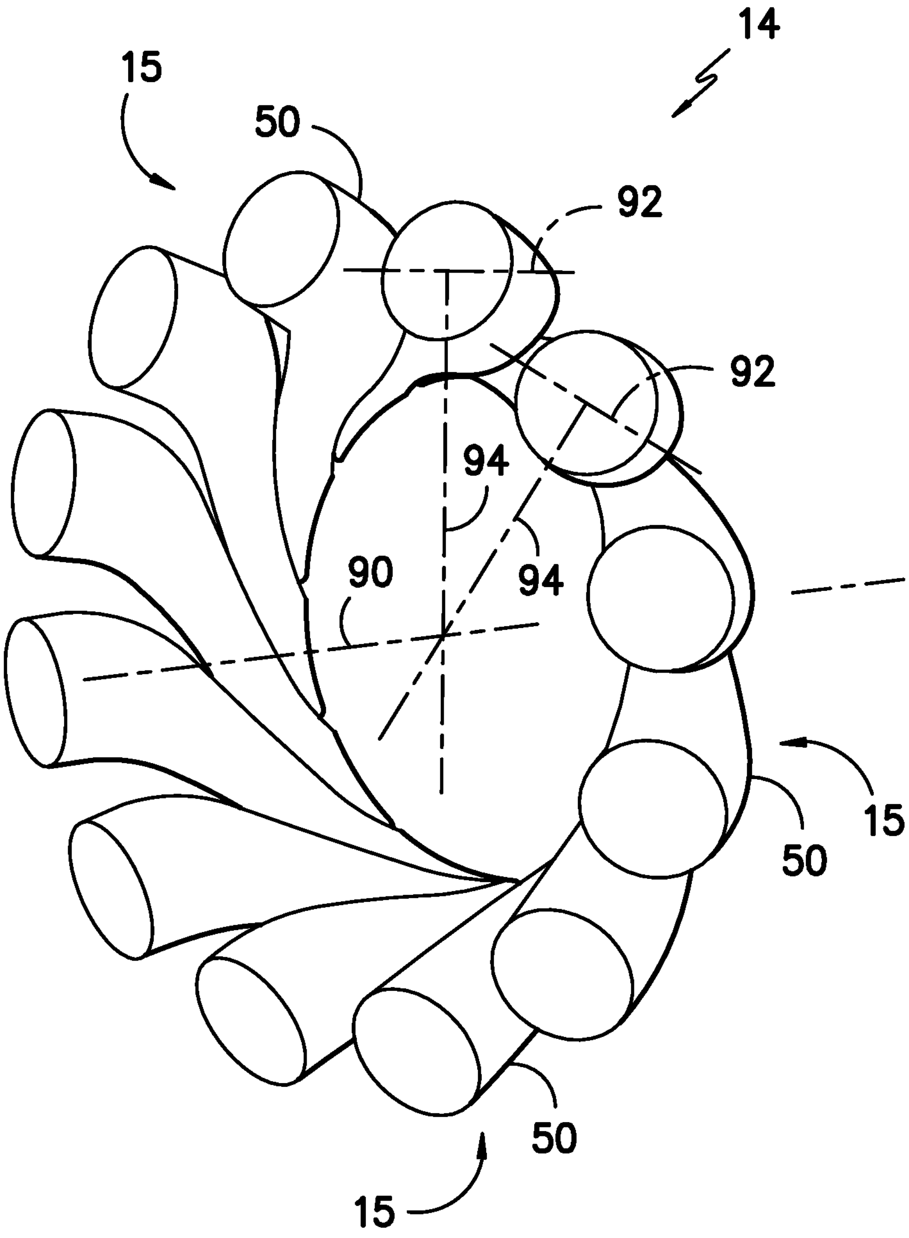
FIG. –3–

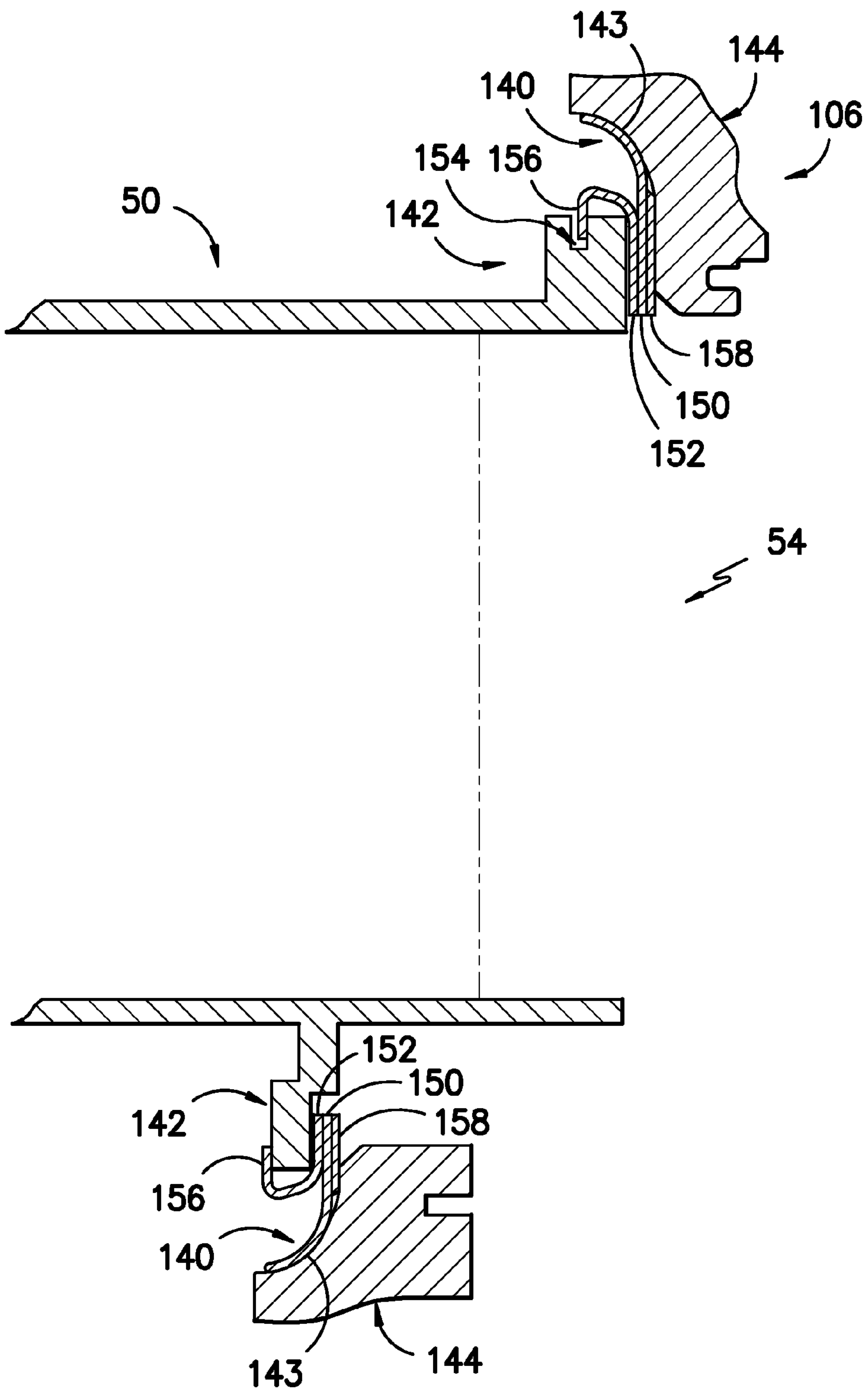
FIG. –8–

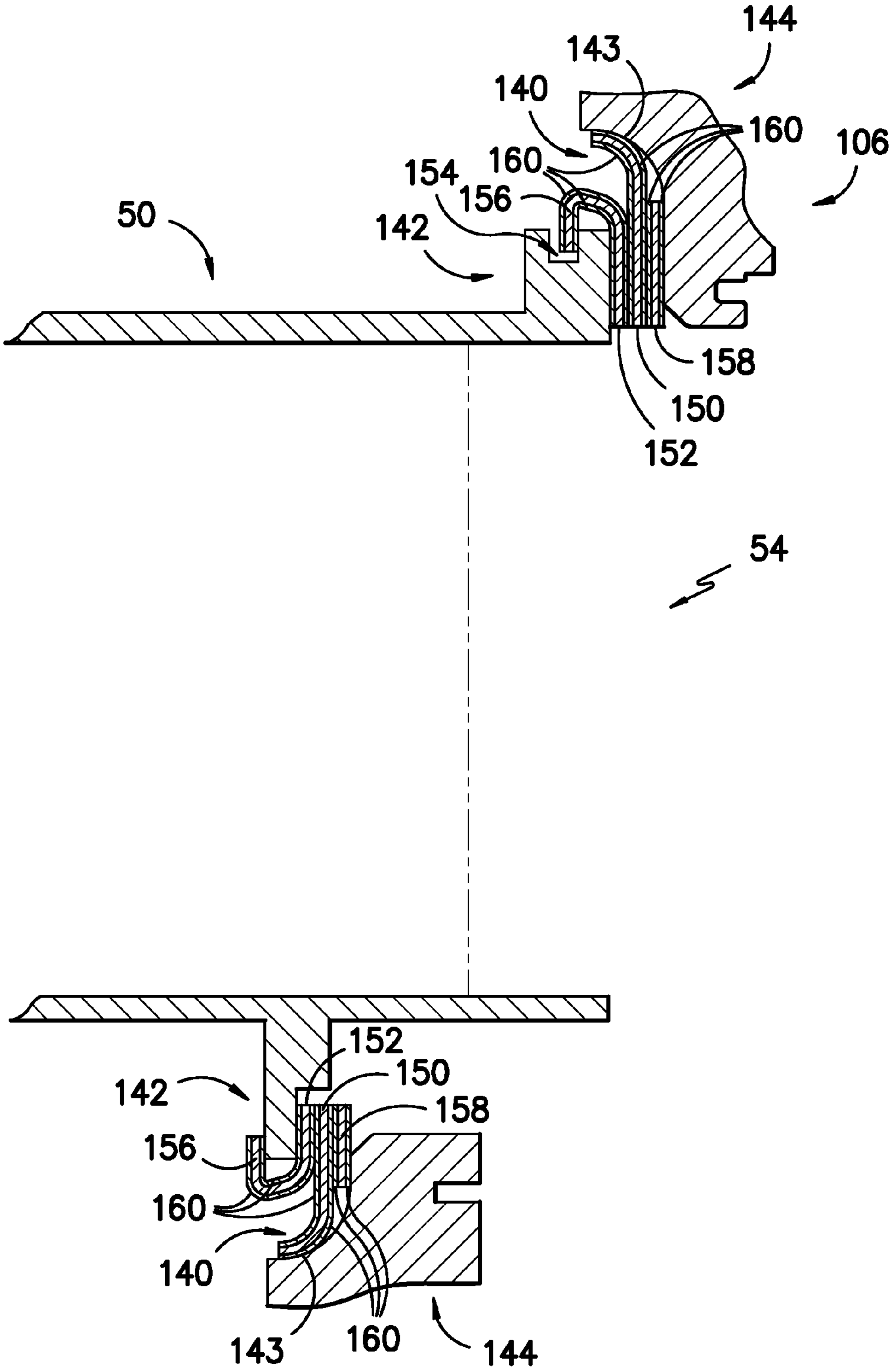
FIG. –9–

FLEXIBLE METALLIC SEAL FOR TRANSITION DUCT IN TURBINE SYSTEM

This invention was made with government support under contract number DE-FC26-05NT42643 awarded by the Department of Energy. The government has certain rights in the invention.

FIELD OF THE INVENTION

The subject matter disclosed herein relates generally to turbine systems, and more particularly to seals between transition ducts and turbine sections of turbine systems.

BACKGROUND OF THE INVENTION

Turbine systems are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The combustor sections of turbine systems generally include tubes or ducts for flowing the combusted hot gas therethrough to the turbine section or sections. Recently, combustor sections have been introduced which include tubes or ducts that shift the flow of the hot gas. For example, ducts for combustor sections have been introduced that, while flowing the hot gas longitudinally therethrough, additionally shift the flow radially or tangentially such that the flow has various angular components. These designs have various advantages, including eliminating first stage nozzles from the turbine sections. The first stage nozzles were previously provided to shift the hot gas flow, and may not be required due to the design of these ducts. The elimination of first stage nozzles may eliminate associated pressure drops and increase the efficiency and power output of the turbine system.

However, the connection of these ducts to turbine sections is of increased concern. For example, because the ducts do not simply extend along a longitudinal axis, but are rather shifted off-axis from the inlet of the duct to the outlet of the duct, thermal expansion of the ducts can cause undesirable shifts in the ducts along or about various axes. Such shifts can cause unexpected gaps between the ducts and the turbine sections, thus undesirably allowing leakage and mixing of cooling air and hot gas.

Accordingly, an improved seal between a combustor duct and a turbine section of a turbine system would be desired in the art. For example, a seal that allows for thermal growth of the duct while preventing gaps between the duct and turbine section would be advantageous.

BRIEF DESCRIPTION OF THE INVENTION

Aspects and advantages of the invention will be set forth in part in the following description, or may be obvious from the description, or may be learned through practice of the invention.

In one embodiment, a turbine system is disclosed. The turbine system includes a transition duct. The transition duct includes an inlet, an outlet, and a passage extending between the inlet and the outlet and defining a longitudinal axis, a radial axis, and a tangential axis. The outlet of the transition duct is offset from the inlet along the longitudinal axis and the tangential axis. The transition duct further includes an interface member for interfacing with a turbine section. The turbine system further includes a flexible metallic seal contacting the interface member to provide a seal between the interface member and the turbine section.

In another embodiment, a turbine system is disclosed. The turbine system includes a transition duct. The transition duct includes an inlet, an outlet, and a passage extending between the inlet and the outlet and defining a longitudinal axis, a radial axis, and a tangential axis. The outlet of the transition duct is offset from the inlet along the longitudinal axis and the tangential axis. The transition duct further includes a first interface member. The turbine system additionally includes a turbine section comprising a second interface member. The turbine system further includes a flexible metallic seal contacting and providing a seal between the first interface member and the second interface member.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic view of a gas turbine system according to one embodiment of the present disclosure;

FIG. 2 is a cross-sectional view of several portions of a gas turbine system according to one embodiment of the present disclosure;

FIG. 3 is a perspective view of an annular array of transition ducts according to one embodiment of the present disclosure;

FIG. 8 is a cross-sectional view of an interface between a transition duct and a turbine section according to one embodiment of the present disclosure; and FIG. 9 is a cross-sectional view of an interface between a transition duct and a turbine section according to another embodiment of the present disclosure.

DETAILED DESCRIPTION OF THE INVENTION

Figure 4:
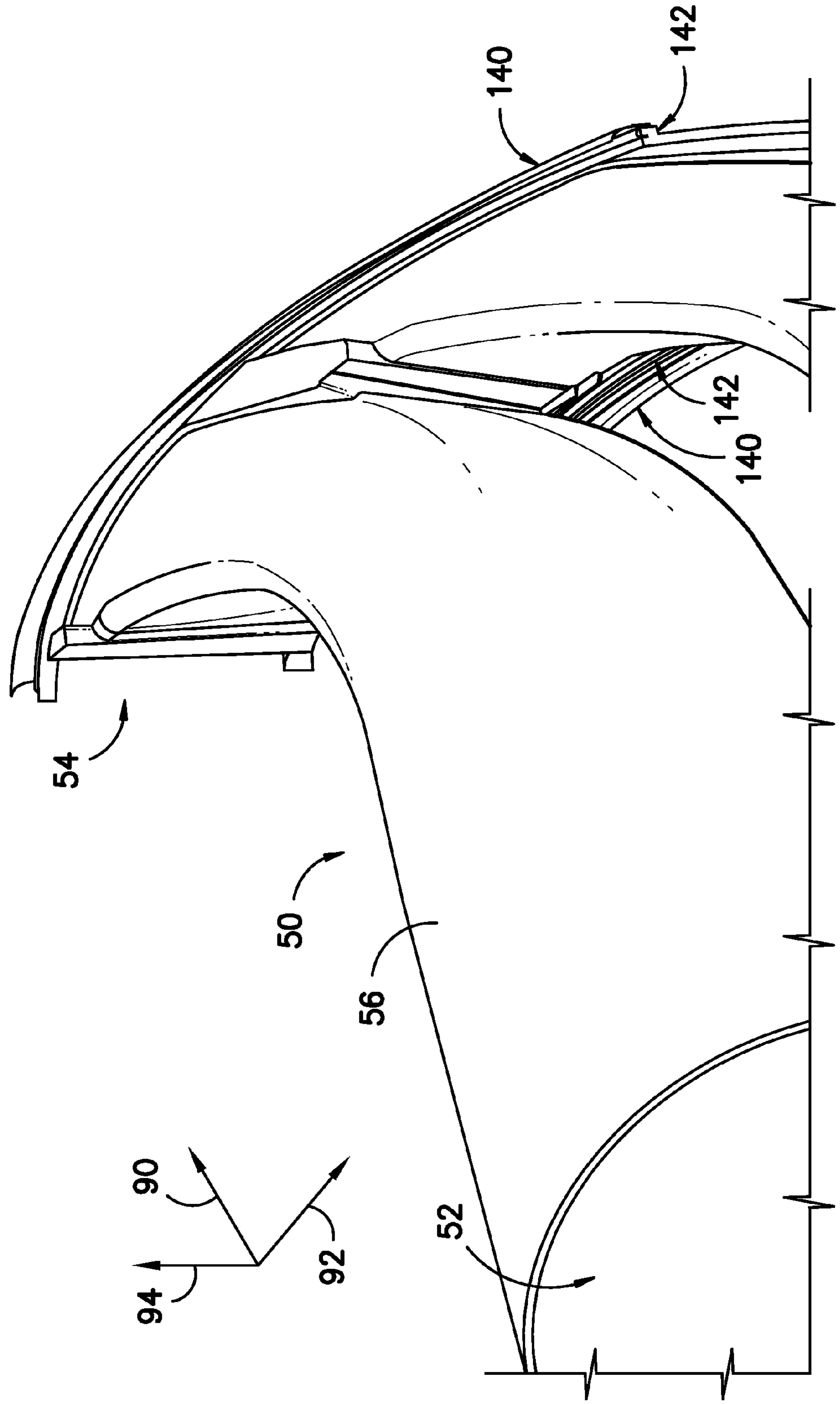
FIG. 4 is a top perspective view of a plurality of transition ducts according to one embodiment of the present disclosure.
Figure 5:
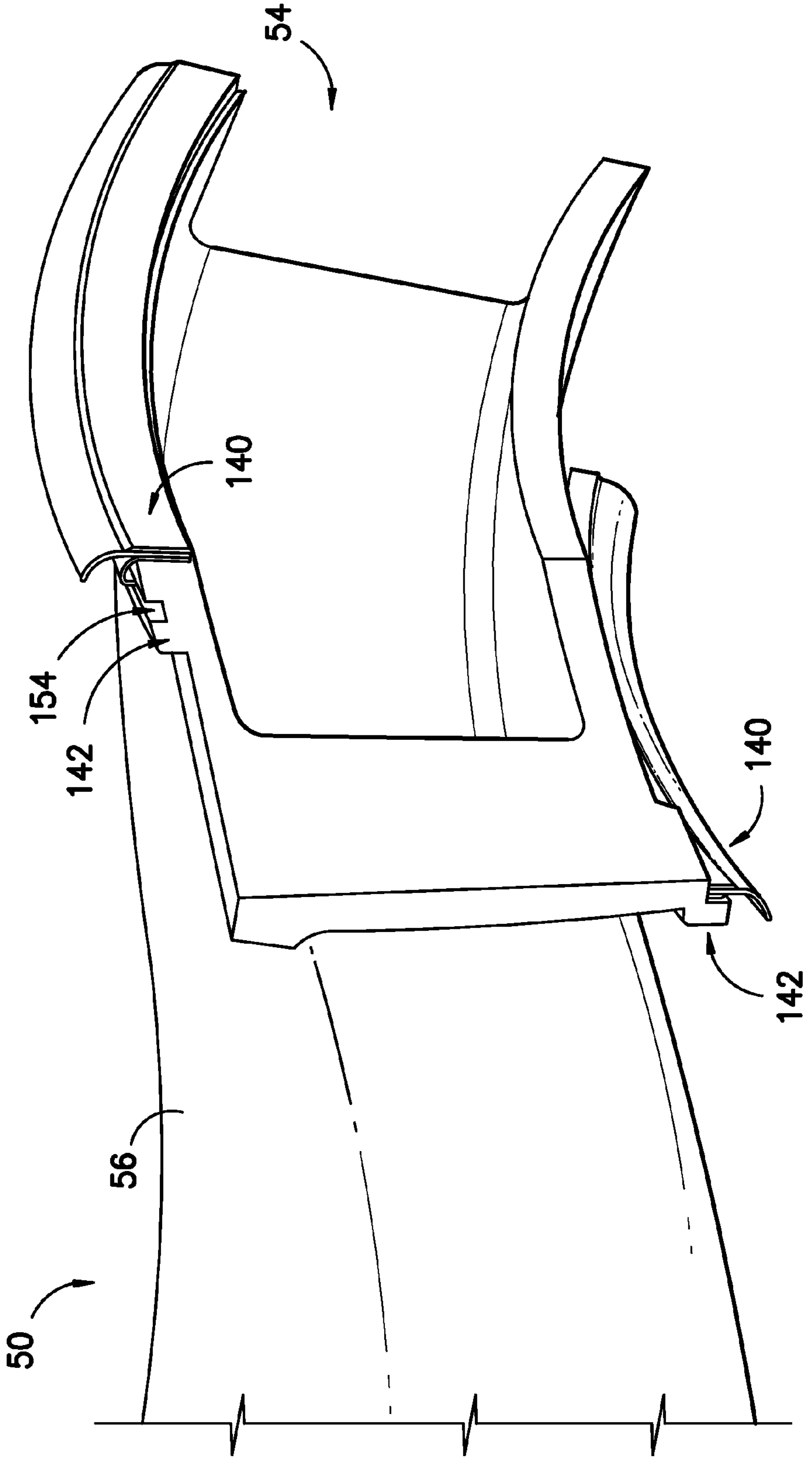
FIG. 5 is a rear perspective view of a plurality of transition ducts according to one embodiment of the present disclosure.
Figure 6:
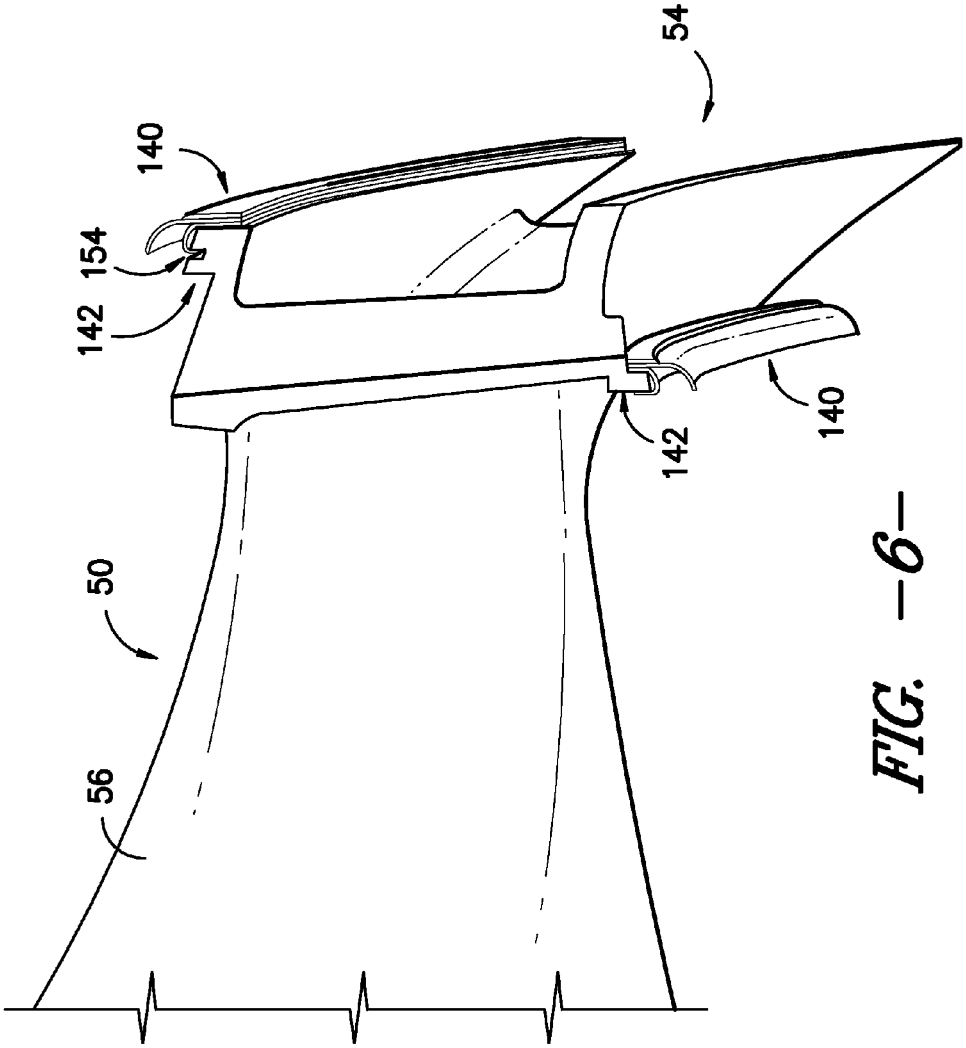
FIG. 6 is a side perspective view of a plurality of transition ducts according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a gas turbine system 10. It should be understood that the turbine system 10 of the present disclosure need not be a gas turbine system 10, but rather may be any suitable turbine system 10, such as a steam turbine system or other suitable system. The gas turbine system 10 may include a compressor section 12, a combustor section 14 which may include a plurality of combustors 15 as discussed below, and a turbine section 16. The compressor section 12 and turbine section 16 may be coupled by a shaft 18. The shaft 18 may be a single shaft or a plurality of shaft segments coupled together to form shaft 18. The shaft 18 may further be coupled to a generator or other suitable energy storage device, or may be connected directly to, for example, an electrical grid. Exhaust gases from the system 10 may be exhausted into the atmosphere, flowed to a steam turbine or other suitable system, or recycled through a heat recovery steam generator.

Referring to FIG. 2, a simplified drawing of several portions of a gas turbine system 10 is illustrated. The gas turbine system 10 as shown in FIG. 2 comprises a compressor section 12 for pressurizing a working fluid, discussed below, that is flowing through the system 10. Pressurized working fluid discharged from the compressor section 12 flows into a combustor section 14, which may include a plurality of combustors 15 (only one of which is illustrated in FIG. 2) disposed in an annular array about an axis of the system 10. The working fluid entering the combustor section 14 is mixed with fuel, such as natural gas or another suitable liquid or gas, and combusted. Hot gases of combustion flow from each combustor 15 to a turbine section 16 to drive the system 10 and generate power.

A combustor 15 in the gas turbine 10 may include a variety of components for mixing and combusting the working fluid and fuel. For example, the combustor 15 may include a casing 21, such as a compressor discharge casing 21. A variety of sleeves, which may be axially extending annular sleeves, may be at least partially disposed in the casing 21. The sleeves, as shown in FIG. 2, extend axially along a generally longitudinal axis 98, such that the inlet of a sleeve is axially aligned with the outlet. For example, a combustor liner 22 may generally define a combustion zone 24 therein. Combustion of the working fluid, fuel, and optional oxidizer may generally occur in the combustion zone 24. The resulting hot gases of combustion may flow generally axially along the longitudinal axis 98 downstream through the combustion liner 22 into a transition piece 26, and then flow generally axially along the longitudinal axis 98 through the transition piece 26 and into the turbine section 16.

The combustor 15 may further include a fuel nozzle 40 or a plurality of fuel nozzles 40. Fuel may be supplied to the fuel nozzles 40 by one or more manifolds (not shown). As discussed below, the fuel nozzle 40 or fuel nozzles 40 may supply the fuel and, optionally, working fluid to the combustion zone 24 for combustion.

As shown in FIGS. 3 through 6, a combustor 15 according to the present disclosure may include a transition duct 50. The transition ducts 50 of the present disclosure may be provided in place of various axially extending sleeves of other combustors. For example, a transition duct 50 may replace the axially extending transition piece 26 and, optionally, the combustor liner 22 of a combustor 15. Thus, the transition duct may extend from the fuel nozzles 40, or from the combustor liner 22. As discussed below, the transition duct 50 may provide various advantages over the axially extending combustor liners 22 and transition pieces 26 for flowing working fluid therethrough and to the turbine section 16.

As shown, the plurality of transition ducts 50 may be disposed in an annular array about a longitudinal axis 90. Further, each transition duct 50 may extend between a fuel nozzle 40 or plurality of fuel nozzles 40 and the turbine section 16. For example, each transition duct 50 may extend from the fuel nozzles 40 to the turbine section 16. Thus, working fluid may flow generally from the fuel nozzles 40 through the transition duct 50 to the turbine section 16. In some embodiments, the transition ducts 50 may advantageously allow for the elimination of the first stage nozzles in the turbine section, which may eliminate any associated drag and pressure drop and increase the efficiency and output of the system 10.

Each transition duct 50 may have an inlet 52, an outlet 54, and a passage 56 therebetween. The inlet 52 and outlet 54 of a transition duct 50 may have generally circular or oval cross-sections, rectangular cross-sections, triangular cross-sections, or any other suitable polygonal cross-sections. Further, it should be understood that the inlet 52 and outlet 54 of a transition duct 50 need not have similarly shaped cross-sections. For example, in one embodiment, the inlet 52 may have a generally circular cross-section, while the outlet 54 may have a generally rectangular cross-section.

Further, the passage 56 may be generally tapered between the inlet 52 and the outlet 54. For example, in an exemplary embodiment, at least a portion of the passage 56 may be generally conically shaped. Additionally or alternatively, however, the passage 56 or any portion thereof may have a generally rectangular cross-section, triangular cross-section, or any other suitable polygonal cross-section. It should be understood that the cross-sectional shape of the passage 56 may change throughout the passage 56 or any portion thereof as the passage 56 tapers from the relatively larger inlet 52 to the relatively smaller outlet 54.

The outlet 54 of each of the plurality of transition ducts 50 may be offset from the inlet 52 of the respective transition duct 50. The term "offset", as used herein, means spaced from along the identified coordinate direction. The outlet 54 of each of the plurality of transition ducts 50 may be longitudinally offset from the inlet 52 of the respective transition duct 50, such as offset along the longitudinal axis 90.

Additionally, in exemplary embodiments, the outlet 54 of each of the plurality of transition ducts 50 may be tangentially offset from the inlet 52 of the respective transition duct 50, such as offset along a tangential axis 92. Because the outlet 54 of each of the plurality of transition ducts 50 is tangentially offset from the inlet 52 of the respective transition duct 50, the transition ducts 50 may advantageously utilize the tangential component of the flow of working fluid through the transition ducts 50 to eliminate the need for first stage nozzles in the turbine section 16, as discussed below.

Further, in exemplary embodiments, the outlet 54 of each of the plurality of transition ducts 50 may be radially offset from the inlet 52 of the respective transition duct 50, such as offset along a radial axis 94. Because the outlet 54 of each of the plurality of transition ducts 50 is radially offset from the inlet 52 of the respective transition duct 50, the transition ducts 50 may advantageously utilize the radial component of the flow of working fluid through the transition ducts 50 to further eliminate the need for first stage nozzles in the turbine section 16, as discussed below.

It should be understood that the tangential axis 92 and the radial axis 94 are defined individually for each transition duct 50 with respect to the circumference defined by the annular array of transition ducts 50, as shown in FIG. 3, and that the axes 92 and 94 vary for each transition duct 50 about the circumference based on the number of transition ducts 50 disposed in an annular array about the longitudinal axis 90.

Figure 7:
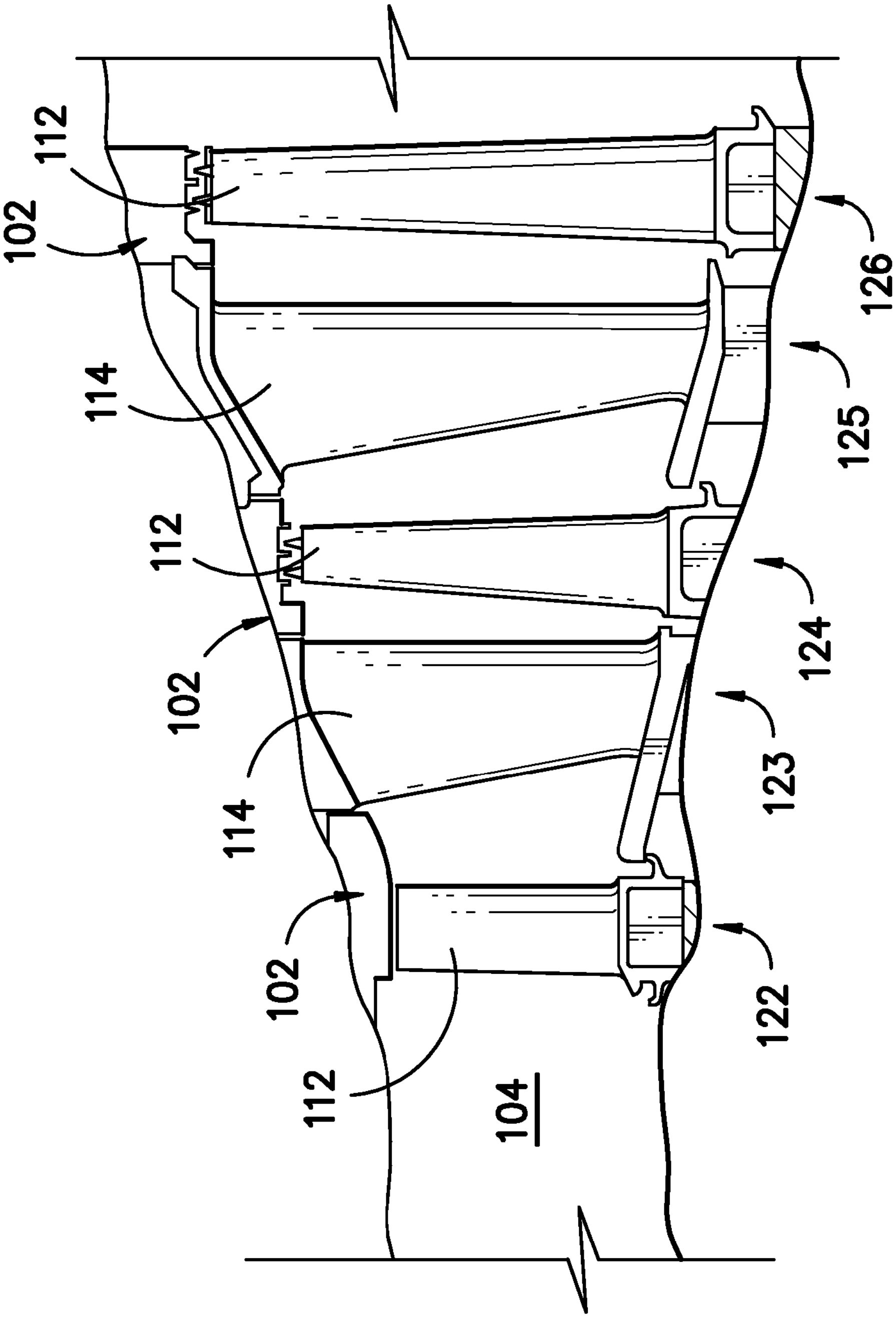
FIG. 7 is a cross-sectional view of a turbine section of a gas turbine system according to one embodiment of the present disclosure.

As discussed, after hot gases of combustion are flowed through the transition duct 50, they may be flowed from the transition duct 50 into the turbine section 16. As shown in FIGS. 7 through 9, a turbine section 16 according to the present disclosure may include a shroud 102, which may define a hot gas path 104. The shroud 102 may be formed from a plurality of shroud blocks 106. The shroud blocks 106 may be disposed in one or more annular arrays, each of which may define a portion of the hot gas path 104 therein.

The turbine section 16 may further include a plurality of buckets 112 and a plurality of nozzles 114. Each of the plurality of buckets 112 and nozzles 114 may be at least partially disposed in the hot gas path 104. Further, the plurality of buckets 112 and the plurality of nozzles 114 may be disposed in one or more annular arrays, each of which may define a portion of the hot gas path 104.

The turbine section 16 may include a plurality of turbine stages. Each stage may include a plurality of buckets 112 disposed in an annular array and a plurality of nozzles 114 disposed in an annular array. For example, in one embodiment, the turbine section 16 may have three stages, as shown in FIG. 7. For example, a first stage of the turbine section 16 may include a first stage nozzle assembly (not shown) and a first stage buckets assembly 122. The nozzles assembly may include a plurality of nozzles 114 disposed and fixed circumferentially about the shaft 18. The bucket assembly 122 may include a plurality of buckets 112 disposed circumferentially about the shaft 18 and coupled to the shaft 18. In exemplary embodiments wherein the turbine section is coupled to combustor section 14 comprising a plurality of transition ducts 50, however, the first stage nozzle assembly may be eliminated, such that no nozzles are disposed upstream of the first stage bucket assembly 122. Upstream may be defined relative to the flow of hot gases of combustion through the hot gas path 104.

A second stage of the turbine section 16 may include a second stage nozzle assembly 123 and a second stage buckets assembly 124. The nozzles 114 included in the nozzle assembly 123 may be disposed and fixed circumferentially about the shaft 18. The buckets 112 included in the bucket assembly 124 may be disposed circumferentially about the shaft 18 and coupled to the shaft 18. The second stage nozzle assembly 123 is thus positioned between the first stage bucket assembly 122 and second stage bucket assembly 124 along the hot gas path 104. A third stage of the turbine section 16 may include a third stage nozzle assembly 125 and a third stage bucket assembly 126. The nozzles 114 included in the nozzle assembly 125 may be disposed and fixed circumferentially about the shaft 18. The buckets 112 included in the bucket assembly 126 may be disposed circumferentially about the shaft 18 and coupled to the shaft 18. The third stage nozzle assembly 125 is thus positioned between the second stage bucket assembly 124 and third stage bucket assembly 126 along the hot gas path 104.

It should be understood that the turbine section 16 is not limited to three stages, but rather that any number of stages are within the scope and spirit of the present disclosure.

As discussed above, the outlet 54 of each of the plurality of transition ducts 50 may be longitudinally, radially, and/or tangentially offset from the inlet 52 of the respective transition duct 50. These various offsets of the transition ducts 50 may cause unexpected movement of the transition ducts 50 due to thermal growth during operation of the system 10. For example, the outlet 54 of a transition duct 50 may interface with the turbine section 16 to allow the flow of hot gas therebetween. However, thermal growth may cause the outlet 54 to move with respect to the turbine section 16 about or along one or more of the longitudinal axis 90, tangential axis 92, and/or radial axis 94.

To prevent gaps between an outlet 54 and turbine section 16, the present disclosure may further be directed to one or more seals 140. Each seal 140 may be provided at an interface between the outlet 54 and turbine section 16. Further, each seal 140 may be flexible. A flexible seal is a seal with at least a portion that flexes to correspond to the contour of a mating surface with which the seal is interfacing to provide a seal therewith, and to maintain such contour and resulting seal during movement of or with respect to such mating surface. A flexible seal according to the present disclosure can flex to maintain such contour and seal during operation of the turbine system 10 despite unexpected movement of the transition duct 50 and outlet 54 along or about one or more of the axes 90, 92, 94. Additionally, each seal 140 according to the present disclosure may be metallic. A metallic seal is a seal with at least a portion formed from a metal or metal alloy or superalloy. For example, a metallic seal may include aluminum, iron, nickel, or any suitable alloy or superalloy thereof, and/or may include any other suitable metal or alloy or superalloy thereof. The present inventors have discovered that flexible metallic seals are particularly advantageous at sealing the interface between an outlet 54 and a turbine section 16, because the flexible metallic seals 140 can accommodate the unexpected movement of the outlet 54 along or about the various axis 90, 92, 94.

As shown in FIGS. 4 through 6 and 8 through 9, a transition duct 50 according to the present disclosure includes one or more first interface members 142. The interface members 142 are positioned adjacent the outlet 54 of the transition duct 50, and may interface with the turbine section 16. An interface member 142 may extend around the entire periphery of the transition duct 50, or any portion thereof. For example, FIGS. 4 through 6 and 8 through 9 illustrate an upper interface member 142 and a lower interface member 142.

Each interface members 142 may interface with any suitable contact surface 143 on the turbine section 16. The seal 140 may be positioned to, and may, contact the contact surface 143. Such contact surface 143 may be part of, or be, a second interface member 144, as shown in FIGS. 8 and 9. In exemplary embodiments, a second interface member 144 may be disposed on, or may be, an upstream outer surface of the shroud 102, which may include the upstream outer surface of a plurality of shroud blocks 106. These shroud blocks 106 may at least partially define the first stage of the turbine section 16.

As shown, a seal 140 according to the present disclosure may contact a first interface member 142 and associated second interface member 144 and contact surface 143 thereof. Such contact may allow the first and second members 142, 144 to interface, and may provide a seal between the first interface member 142 and second interface member 144, and thus between a transition duct 50 and turbine section 16.

Exemplary seals 140 are shown in FIGS. 4 through 6 and 8 through 9. A seal 140 according to the present disclosure may, in some embodiments, include a seal plate 150. At least a portion of the seal plate 150 may be flexible, as discussed above. Further, in some embodiments as shown, at least a portion of the seal plate 150 has a curvilinear cross-sectional profile. This curvilinear portion may be the flexible portion. Additionally or alternatively, however, at least a portion of the seal plate 150 has a linear cross-sectional profile. The flexible and/or curvilinear portion of the seal plate 150 may be positioned to, and may, contact the transition duct 50 or turbine section 16, such as an interface member thereof, to provide a seal as discussed above.

Further, in some embodiments, at least a portion of the seal 140, such as of the seal plate 150 thereof, may have a contour that generally corresponds to the contour of the surface that the portion is contacting when the seal 140 is in an operating condition. An operating condition is a condition wherein the seal 140 is subjected to the temperature or temperature range and pressure or pressure range that it may be subjected to during normal operation of the system 10. For example, in one embodiment, the operating condition may be the condition that the seal 140 is being subjected to inside of the system 10 during operation thereof. The surface may be, for example, the contact surface 143. The portion having such contour may, in some embodiments, be the flexible portion. The corresponding contour of the portion of the seal 140 or seal plate 150 and the surface that the portion is contacting may facilitate sealing when the seal 140 contacts the interface members. Such portion may further flex as necessary along or about one or more axes 90, 92, 94 during operation of the turbine system 10 to maintain such corresponding contour and to maintain such seal.

In some embodiments, a seal 140 according to the present disclosure may further include a retention plate 152. The retention plate 152 may contact one of the first interface member 142 or second interface member 144 and may be disposed between the seal plate 150 and that member. In some embodiments, the retention plate 152 may retain the seal 140 in contact with the interface member that the retention plate 152 is contacting, such as the first interface member 142. For example, in some embodiments, the retention plate 152 may be mounted to a surface of the interface member through a suitable adhesive, weld, or other suitable mounting apparatus or method. In other embodiments, an interface member, such as the first interface member 142 as shown, may define a channel 154. At least a portion of the retention plate 152, such as a hook portion 156, may be disposed in the channel 154. Such portion may further, in some embodiments, be mounted in the channel 154 through use of a suitable adhesive, weld, or other suitable mounting apparatus or method. Such portion may retain the seal 140 in contact with the interface member. In other embodiments, the retention plate 152 may not be mounted to a surface or in a channel 154, and may rather be retained to the surface or in the channel 154 due to the geometry and forces of the various assembled components, such as the interface members and seal 140, and/or due to the pressure that the seal 140 is subjected to during operation of the system 10.

In some embodiments, a seal 140 according to the present disclosure may further include a contact plate 158. A contact plate 158 may be positioned to contact, and be in contact with, a surface of an interface member, such as the contact surface 143 of a second interface member 144. The contact plate 158 may be positioned between such surface and the seal plate 150. The contact plate 158 may stabilize and maintain a seal between the seal 140 and that interface member, such as the second interface member 144, and may further stabilize the positioning of the seal 140 with respect to the other interface member 142.

In some embodiments, as shown in FIG. 9, a seal 140 or any portion thereof may include a cloth layer 160. One or more cloth layers 160 may be provided on and in contact with the surfaces of the various plates of the seal 140. The various plates may contact each other and other various surfaces through the cloth layer 160. For example, as shown, cloth layers 160 may be provided on the opposing surfaces of the seal plate 150, retention plate 152, and/or contact plate 158. A cloth layer 160 may include metal, ceramic, and/or polymer fibers which have been woven, knitted, or pressed into a layer of fabric. A cloth layer 160 may cover at least a portion of a seal 140 and protect that portion of the seal 140 from exposure to high temperatures. A cloth layer 160 may further facilitate sealing as well as damping of the system 10 during operation thereof.

A seal 140 of the present disclosure may advantageously allow the transition duct 50, such as the outlet 54 of the transition duct 50, to move about or along one or more of the various axis 90, 92, 94 while maintaining a seal with the turbine section 16. This may advantageously accommodate the thermal growth of the transition duct 50, which may be offset as discussed above, while allowing the transition duct 50 to remain sufficiently sealed to the turbine section 16. In exemplary embodiments, for example, the seal 140 may allow movement of the transition duct 50, such as of the outlet 54 of the transition duct 50, about or along one, two, or three of the longitudinal axis 90, the tangential axis 92 and the radial axis 94. In exemplary embodiments, the seal 140 allows movement about or along all three axes. Thus, seals 140 advantageously provide a seal that accommodates the unexpected movement of the transition ducts 50 of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine system, comprising:

a transition duct comprising an inlet, an outlet, and a passage extending between the inlet and the outlet and defining a longitudinal axis, a radial axis, and a tangential axis, the outlet of the transition duct offset from the inlet along the longitudinal axis and the tangential axis, the transition duct further comprising an interface member for interfacing with a turbine section;

a flexible metallic seal contacting the interface member to provide a seal between the interface member and the turbine section, the seal comprising a plurality of layers, at least one of the plurality of layers in contact with the turbine section and at least one other of the plurality of layers in contact with the interface member, wherein one of the plurality of layers is a seal plate, at least a portion of the seal plate having a curvilinear cross-sectional profile; and wherein at least a portion of the seal has a contour that generally corresponds to and maintains a contour of a contact surface of the turbine section in an operating condition.

2. The turbine system of claim 1, wherein the portion of the seal plate having the curvilinear cross-sectional profile is positioned to contact the turbine section.

3. The turbine system of claim 1, wherein the seal comprises a retention plate contacting the interface member.

4. The turbine system of claim 3, wherein the retention plate retains the seal in contact with the interface member.

5. The turbine system of claim 3, wherein the interface member defines a channel, and wherein at least a portion of the retention plate is disposed in the channel.

6. The turbine system of claim 1, wherein the seal comprises a contact plate positioned to contact a contact surface of the turbine section.

7. The turbine system of claim 1, further comprising a plurality of seals.

8. The turbine system of claim 1, further comprising a plurality of interface members.

9. The turbine system of claim 1, wherein the outlet of the transition duct is further offset from the inlet along the radial axis.

10. The turbine system of claim 1, further comprising a plurality of transition ducts, each of the plurality of transition ducts disposed annularly about the longitudinal axis and connected to the turbine section.

11. The turbine system of claim 1, wherein the interface member is a first interface member, further comprising the turbine section, the turbine section comprising a second interface member for interfacing with the first interface member, the seal contacting the second interface member to provide a seal between the first and second interface members.

12. The turbine system of claim 11, wherein the turbine section comprises a first stage bucket assembly, and wherein no nozzles are disposed upstream of the first stage bucket assembly.

13. A turbine system, comprising:

a transition duct comprising an inlet, an outlet, and a passage extending between the inlet and the outlet and defining a longitudinal axis, a radial axis~ and a tangential axis, the outlet of the transition duct offset from the inlet along the longitudinal axis and the tangential axis, the transition duct further comprising a first interface member;

a turbine section comprising a second interface member;

a flexible metallic seal contacting and providing a seal between the first interface member and the second interface member, the seal comprising a plurality of layers, at least one of the plurality of layers in contact with the second interface member and at least one other of the plurality of layers in contact with the first interface member, wherein one of the plurality of layers is a seal plate, at least a portion of the seal plate having a curvilinear cross-sectional profile; and wherein at least a portion of the seal has a contour that generally corresponds to and maintains a contour of a contact surface of the second interface member in an operating condition.

14. The turbine system of claim 13, wherein the portion of the seal plate having the curvilinear cross-sectional profile contacts the second interface member.

15. The turbine system of claim 13, wherein the seal comprises a retention plate contacting the first interface member.

16. The turbine system of claim 13, wherein the seal comprises a contact plate positioned to contact a contact surface of the second interface member.

* * * * *